Oct. 30, 1945.  S. W. BRIGGS  2,387,714
ADSORBENTS, MAKING AND USING SAME
Filed Oct. 28, 1938
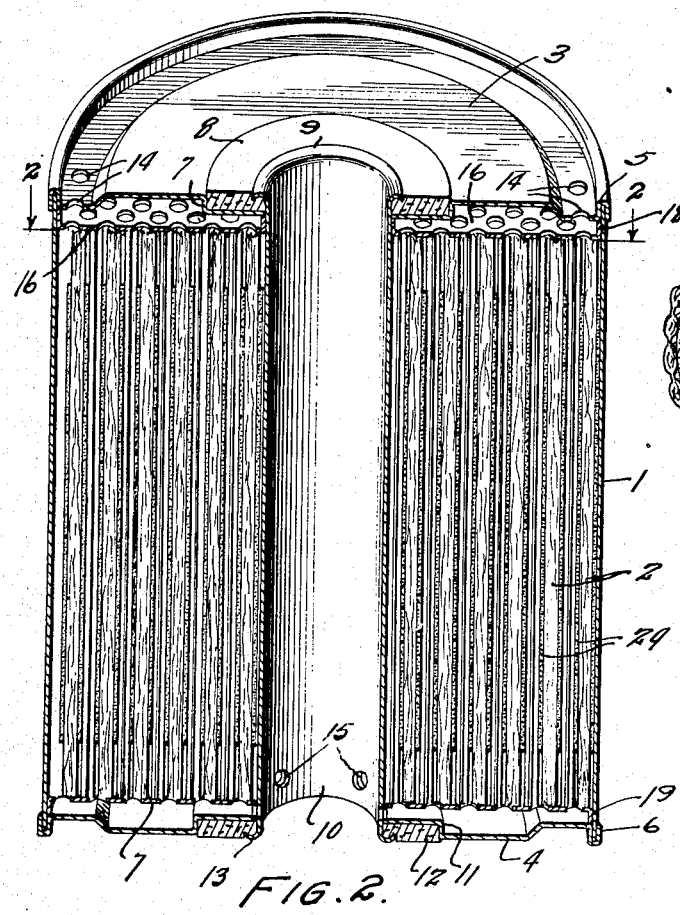
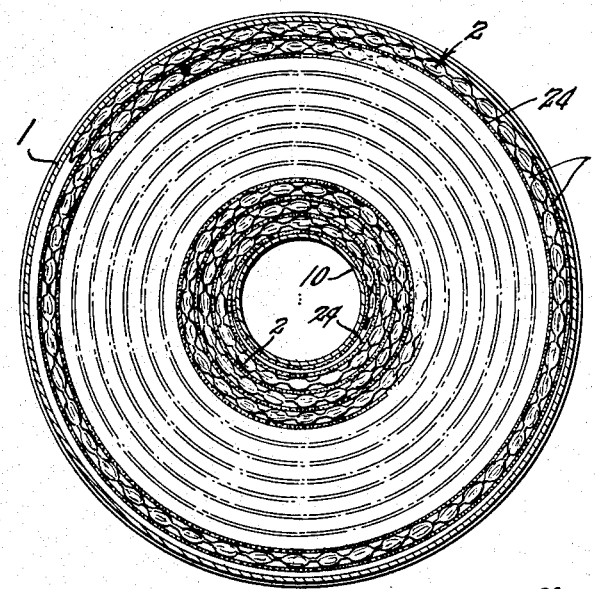
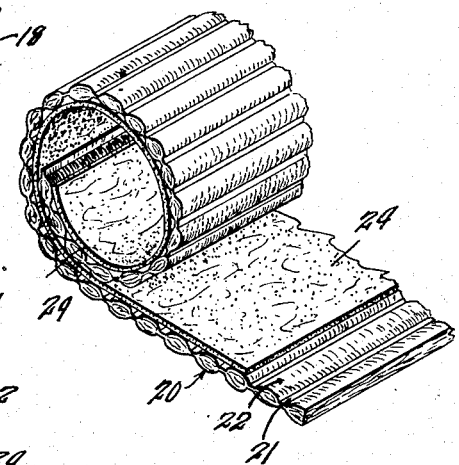
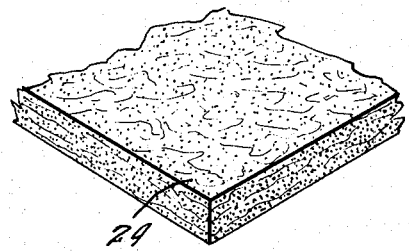
Inventor
SOUTHWICK W. BRIGGS
By Semmes, Keegin & Semmes
Attorney Patented Oct. 30, 1945

2,387,714

UNITED STATES PATENT OFFICE 2,387,714

ADSORBENT MAKING AND USING SAME

Southwick W. Briggs, Washington, D. C., assignor to Briggs Clarifier Company, Washington, D. C., a corporation of Delaware Application October 28, 1938, Serial No. 237,554

9 Claims. (Cl. 210—204)

My invention relates to an adsorbent material, to the process for making the same, and to a device for using it.

There are many uses for adsorbent material. Particularly adsorbent material is used to remove deleterious traces of substances present in fluids. In general, the adsorbent material may be in lump form. For instance, where percolating filters are employed, the adsorbent material, such as charcoal, fuller's earth, greensand, bauxite, etc., is generally in the form of small lumps. This form of the adsorbent is objectionable under certain conditions of use.

My invention enables a much smaller particle size of adsorbent to be employed than is ordinary practice. In ordinary practice where extremely fine particles of adsorbent are used, the filter bed quickly blocks and forms a slime film over the entering surface.

In the instant invention the adsorbent is combined with a flexible base or bonding agent. I may employ cellulosic fiber as the bonding agent. The adsorbent material can be in very fine condition, distributed evenly through the fiber. In manufacture the cellulosic fiber and the adsorbent material, such as bauxite, are beaten together into a pulp in the presence of a liquid; the pulp is dried and compressed into paper-like strips which retain flexibility and which, in themselves, form an excellent adsorbent material. Bauxite, or other adsorbent, may be under 60 mesh in fineness. I have found the material to be particularly effective where the bauxite is over 25 percent by weight of the final material. As the material is used in thicker strips, the percentage by weight of bauxite may be increased to as high as 75 percent of the total weight of the adsorbent mixture. In ordinary small filters for commercial purposes, I regularly employ an adsorbent material having approximately 50 percent by weight of bauxite.

By reason of the flexibility of the adsorbent material, I am enabled to use strips of the material between layers of embossed cellulose wadding, such as I employ in the filter shown in my co-pending application Serial No. 237,553, filed October 28, 1938, now Patent No. 2,321,985 issued June 15, 1943. Obviously, the material is of use in other places. The flexibility of the material enables it to be used in instances where granular adsorbent could not be profitably employed.

The adsorbent properties of the material are greater than the adsorbent properties of the bauxite alone. Moreover, finely powdered bauxite may be employed which is impractical under ordinary conditions.

My flexible adsorbent material is of a density such that it cannot ordinarily be employed as a filtering medium. The high percentage of bauxite which I may employ practically prohibits the use of the adsorbing material as a filtering agent.

In building one type of filter in which I may employ my flexible adsorbent material, I roll a flexible sheet of the material together with a sheet of embossed cellulosic wadding to form a purifying cell. Channels are formed between the ribs of the embossed surface of the cellulosic sheet and the adjacent sheet of flexible adsorbent material, the embossed ribs having their length lying in the direction of the flow of the fluid to be purified, as more fully described in my application Serial No. 237,553, filed October 28, 1938, now Patent No. 2,321,985 issued June 15, 1943.

In the drawing:

Figure 1 is a perspective view, partly in section, showing the construction of my device;

Fig. 2 is a cross sectional view taken on the line 2—2 of Figure 1, looking in the direction of the arrows;

Fig. 3 is a detail perspective view showing how the sludge removing section of my device is formed;

Fig. 4 is a detail perspective view of my adsorbent material.

Referring to the drawing, I have shown a container can 1 adapted to contain a sludge removing element designated generally as 2. The container can 1 is provided with a top 3 and a bottom 4. The top 3 is swaged, as indicated at 5, over the end of the circular can body 1, and likewise the bottom 4 is swaged, as indicated at 6, over the circular bottom of the side wall 1. The top 3 is provided with an annular recess 7, in which rests a washer 8. The washer 8 is held in place by the downturned end 9 of a central tube 10.

Likewise there is provided at 11 an annular depression in the bottom 4 in which rests a similar washer 12, held in place by the turned over end 13 of the central tube 10. The top 3 is provided with apertures 14 through which the fluid may pass. Also for the free flow of fluid through the sludge removing element 2 there are provided apertures 15 in the central tube 10.

The sludge removing element 2 is held in place by means of perforated spacers 16 and 17 having up-struck ends 18 and 19, respectively, which rest against the top 3 and the bottom 4.

The sludge removing element 2 is composed of rolled embossed cellulose wadding 20 such as disclosed in my co-pending application Serial No. 237,553 filed October 28, 1938, now Patent No. 2,321,985 issued June 15, 1943. This cellulose wadding is pressed to form a sheet consisting of grooves 21 alternating with ribs 22. The fibers of cellulose are tightly compressed at the sections of the sheet formed by the grooves 21, but loosely packed at the portions forming the ridges 22.

The arrangement of the wadding 20 is such that the ribs 22 have their length in the direction of flow of the fluid through the cleansing device or regulator.

In operation the sludge removing element 2 takes the suspended solid particles out of the fluid, such as in removing carbon particles from oil.

By reason of the rolling upon itself of the cellulose wadding, there are created a series of channels 23 (see Figure 2). The fluid flows freely through the channels, and in its flow deposits the solid particles suspended therein in the wadding 20. The exact theory of operation is not fully understood, but it is believed that the solid particles are absorbed by the loosely packed ribs 22 and their movement impeded by the fibers of cellulose.

The removing section of the device has rolled in it, between the embossed cellulose wadding layers 20, my adsorbent material which I have indicated in Figures 3 and 4 by the numeral 24. This material is flexible and can be rolled right in with the embossed cellulose wadding.

As previously explained, the material consists of a flexible bonding agent and an adsorbent. The adsorbent material is close grained, tightly packed material, which cannot be used as a filter itself, but it serves the purpose of an adsorbent, and in fact increases the efficiency of the adsorbent material itself which is bonded with the flexible base. I can use finely ground adsorbents, 60 mesh or finer, and prefer to employ finely ground bauxite. As a flexible base I prefer cellulosic fibers. In manufacture the bauxite and the cellulosic fibers are pulped together, compressed and dried.

A dirt concentrator constructed as has been described will remove sludge particles from fluid coming in contact with the sludge removing element 2. Moreover the adsorbent material 24 also contacts the fluid and acts to adsorb acids, bleach the fluid, and in fact to perform all the functions of an adsorbent.

As hereinbefore explained, the particle size of the adsorbent I use in my composition adsorbent material may be considerably below that size which is practical with ordinary type filters.

While I have shown specific examples of the application of my invention disclosed herein, it is to be understood that I am not to be limited except by the showing of the prior art and by the scope of the appended claims.

I claim:

1. A device for purifying fluid comprising a roll of embossed cellulose wadding having ribs disposed axially with respect to the roll, and having between adjacent surfaces of the wadding within the roll a flexible adsorbent material containing cellulosic fiber and finely divided bauxite of under 60 mesh in fineness, said adsorbent mixture being dense and compact and containing over 25 percent by weight of the bauxite.

2. A device for removing solid particles and dissolved impurities from liquids comprising a roll of loosely packed fibrous material having between its contiguous surfaces a sheet of flexible adsorbent material close grained and so tightly packed that it has a density too high for use as a filter, one of said materials being ribbed to thereby form in conjunction with the other material channels through which the fluid to be treated is adapted to pass means for introducing liquid to be purified into one end of the channels, and means for collecting purified fluid discharged from the other end of the channels.

3. A method of separating solids, acids and other impurities from oil comprising passing oil having impurities therein lengthwise through a well-defined, relatively straight channel open at both ends, said channel being of restricted cross section but yet greater than the solid particles to be separated, a portion of the sides of said channels being formed of relatively loosely packed fibers and other portions being formed of closely packed fibers, and still other portions being formed of fibers having finely divided, close grained, tightly packed, adsorbent material admixed therewith, whereby a substantial portion of the solids is deposited upon said fibers and acids are taken up by the adsorbent material during passage of the oil through the channel.

4. A device for clarifying oil comprising a unit having passages extending therethrough of a cross sectional area greater than the size of solid particles to be removed from the oil, means for supplying oil to be purified to one end of said passages, and means for collecting purified oil at the other ends of the passages, each of said passages having one portion of its inner wall formed of loosely packed fibrous material and another portion formed of fibrous adsorbent material having a finely divided, tightly packed adsorbent material therein.

5. An apparatus for removing solids and other impurities from liquid comprising a body of fibrous material having a plurality of relatively straight channels extending therethrough, said channels being of restricted cross section but yet greater than the size of the solid particles to be separated, a portion of the sides of said channels being formed of relatively loosely packed fibers, another portion being formed of closely packed fibers and a further portion having finely divided, tightly packed adsorbent material dispersed therein, said channels being open at both ends for the free flow of the solid containing liquid therethrough, and means for passing a liquid having solids suspended therein lengthwise through said channels and for preventing flow of liquid transversely through said body to cause a substantial portion of the solids to be deposited upon said fibers during passage of the liquid through the channels.

6. A device for clarifying oil comprising a sheet of loosely packed fibrous material, another sheet in contact with the surface thereof carrying a granular finely powdered adsorbent constituting over 25 per cent by weight and being of such a density as to be impractical for filtration of the oil through the sheet, one of said sheets being ribbed to thereby form in conjunction with the other sheet channels through which the oil is adapted to pass, and means for passing the oil through said channels.

7. A device for removing solid particles and dissolved impurities from oil comprising a roll of two juxtaposed sheets of clarifying material, one sheet consisting of embossed loosely packed fibrous material having grooves in its surfaces extending axially of the roll, and the other sheet consisting of a close grained, tightly packed composition of a finely divided adsorbent intimately combined with fibrous material, said grooves cooperating with the adjacent surfaces of the sheet containing the adsorbent material to form flow channels extending axially of the roll, means for introducing into said channels at one end of the roll, oil containing solids and dissolved impurities, and means for collecting purified oil discharged from the channels at the other end of the roll.

8. In an oil clarifier, a flexible fibrous sheet having a granular finely powdered adsorbent intimately admixed therewith and constituting over 25 per cent by weight of the sheet, said sheet being of such a density as to be impractical for filtration of the oil through the sheet, a channel forming member having portions contacting the flexible sheet and other portions spaced from the sheet and cooperating with the sheet to provide a flow channel, a portion of which is constituted by a surface of said sheet, and means for introducing oil into one end of the channel for flow therethrough over said surface of the sheet.

9. In an oil clarifier, a flexible fibrous sheet having a granular finely powdered adsorbent intimately admixed therewith and constituting over 25 per cent by weight of the sheet, said sheet being of such a density as to be impractical for filtration of the oil through the sheet, passage forming means for confining oil to be clarified to a definite flow path, said sheet being disposed in association with said passage forming means with at least one of its surfaces exposed to the interior of said passage for the flow over said surface of oil passing through said passage, and means for introducing oil to be clarified into said passage for flow therethrough over said surface of the sheet.

SOUTHWICK W. BRIGGS.